Aug. 20, 1946.   J. M. HAIT   2,406,288
AMPHIBIAN
Filed Feb. 15, 1943   2 Sheets-Sheet 1
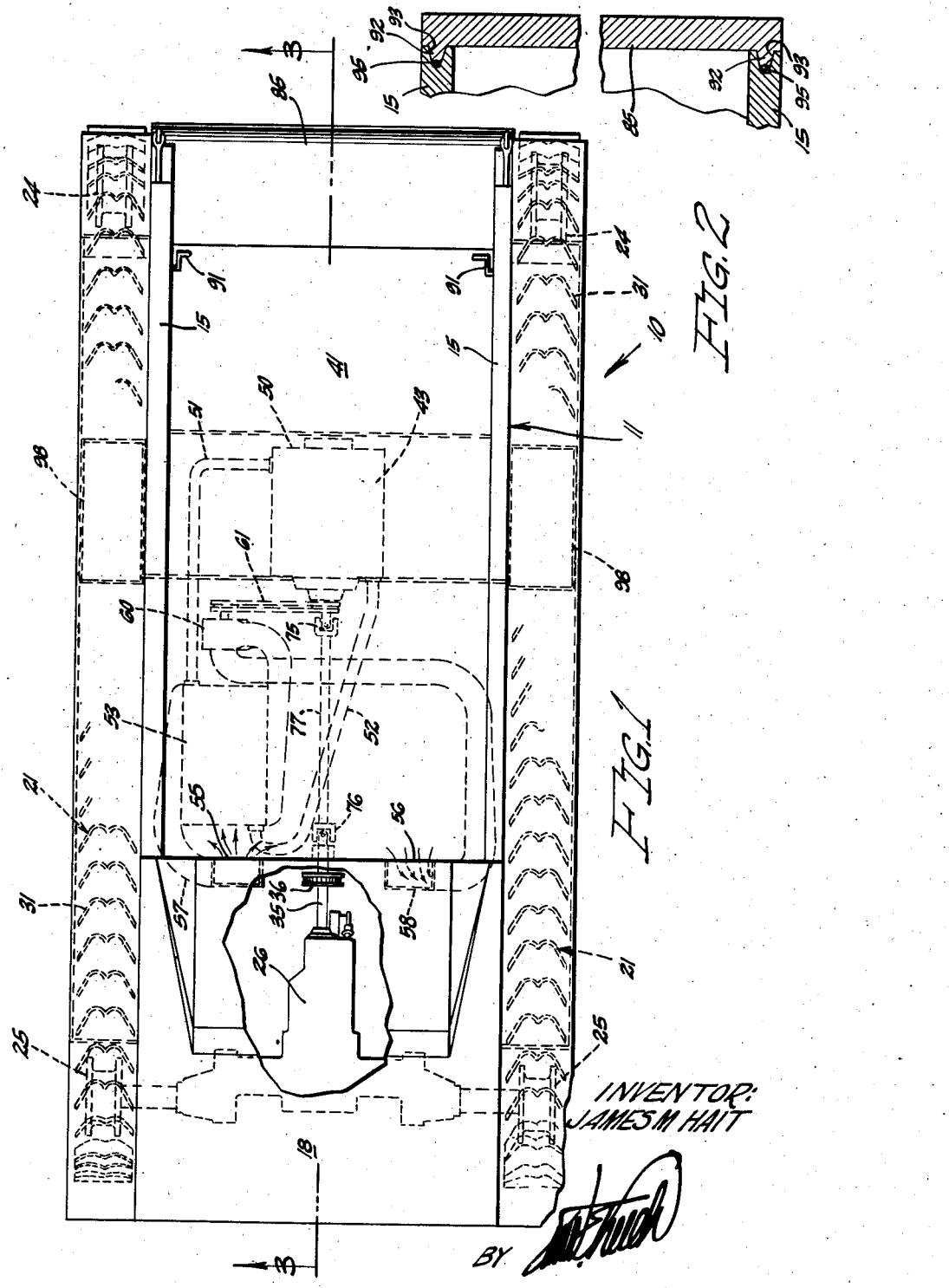

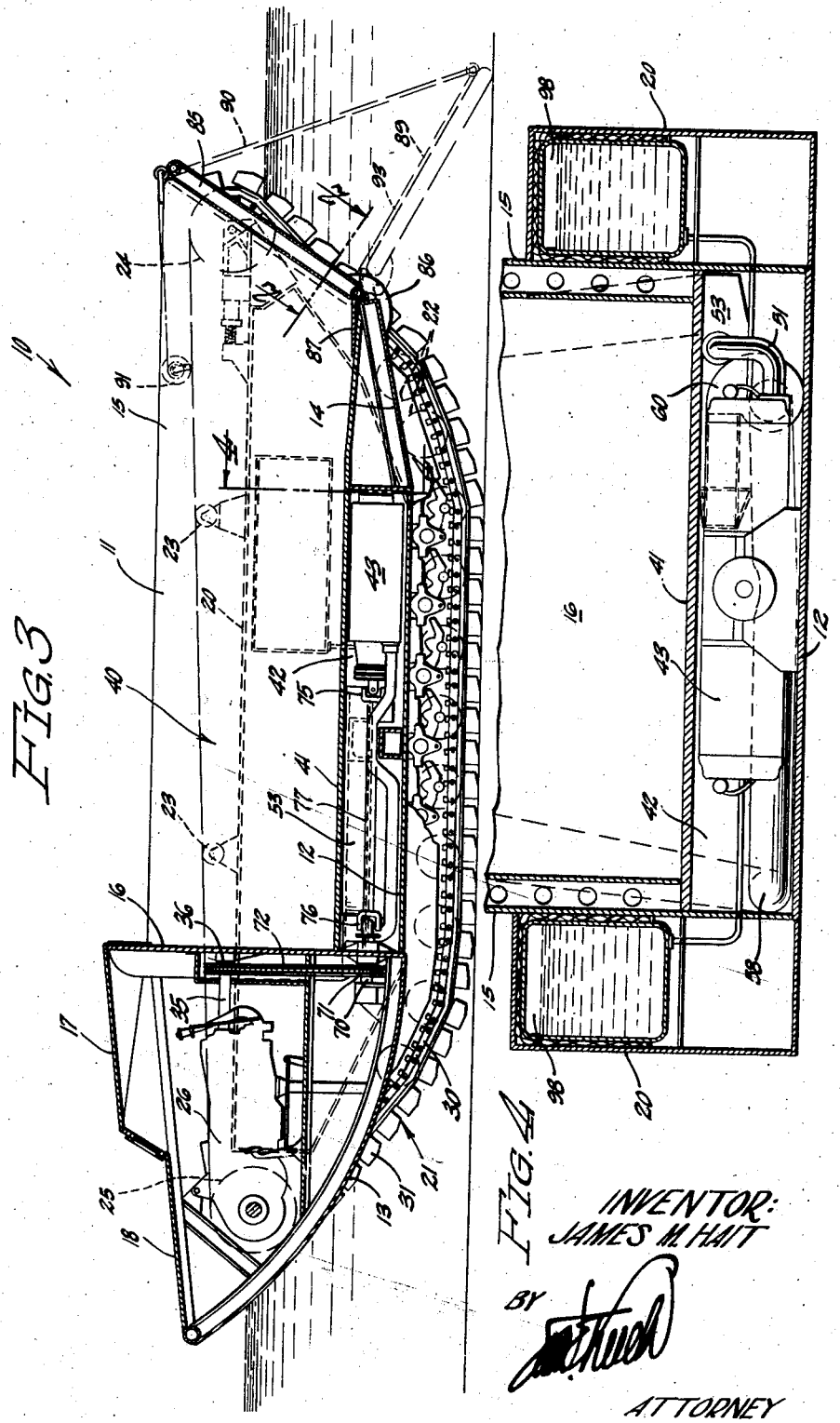

Patented Aug. 20, 1946

2,406,288

UNITED STATES PATENT OFFICE 2,406,288

AMPHIBIAN

James M. Hait, San Gabriel, Calif., assignor to Food Machinery Corporation, San Jose, Calif., a corporation of Delaware Application February 15, 1943, Serial No. 475,934

10 Claims. (Cl. 115—1)

This invention relates to amphibians, and has particular utility in cargo-carrying amphibians employed in amphibious naval warfare.

Amphibians provided for this purpose have track-laying belts mounted on opposite sides thereof, and must be relatively short to permit them to turn readily by differential driving of these belts. The cargo-carrying compartment in the ship must therefore be fairly deep with its floor well below the water level to accommodate the load they are designed to carry. Access to the cargo compartment in the loading or unloading of cargo is had by lifting the cargo over the topside, and this constitutes a serious drawback where heavy pieces of cargo are carried, as it requires a large force of men or special equipment to accomplish the loading or unloading of the ship.

Another serious handicap inherent in this design is found in the hazards to which soldiers carried by the amphibian are subjected when they have to climb over the top side in the face of enemy fire, either to enter or leave the amphibian.

It is an object of my invention to provide an amphibian onto which cargo may be loaded and from which it may be unloaded without passing over the topside of the ship.

Contrary to amphibians, the common design of landing boats is to make these relatively long and shallow, with their deck disposed above the water level, and provide an end door which may be lowered onto the beach to serve as a ramp over which men and cargo, including wheeled vehicles, may be transferred from the deck onto the beach, or vice versa. However, amphibians have heretofore been thought bound by certain design limitations which prevented their being equipped with any such door. For an amphibian to be well balanced in the water, either when loaded or light, it is necessary that the heavier elements of the equipment, such as the engine, transmission, control cabin, and fuel tanks be distributed about the ship in balancing relation with the center of buoyancy. It has become the practice, therefore, to occupy and block each end of the ship with one or more of these heavier equipment items. As the track-laying mechanisms are mounted on the side walls of the ship, it is simply not practical in conformity with this accepted principle of design for amphibians, to provide a door in a hull wall of the amphibian for introducing cargo into or unloading it from the cargo compartment of the ship.

It is a further object of my invention to provide an amphibian in which the heavier items of equipment are so disposed as to give the amphibian good balance in the water when traveling loaded or light, and at the same time leave one end of the amphibian free for the installation of a door therein.

The manner of accomplishing the foregoing objects, as well as further objects and advantages, will be made manifest in the following description taken in connection with the accompanying drawings, in which:

Fig. 1 is a diagrammatic plan view of a preferred embodiment of the invention.

Fig. 2 is a diagrammatic sectional view taken on the line 2—2 of Fig. 3.

Fig. 3 is a longitudinal sectional view taken on the line 3—3 of Fig. 1, and showing the mounting of the motor of the amphibian beneath the floor thereof.

Fig. 4 is an enlarged fragmentary cross section taken on the line 4—4 in Fig. 3.

Referring specifically to the drawings, the amphibian 10 shown therein includes a hull 11 having a central bottom plate 12, an arcuate bow plate 13, a sloping stern bottom plate 14, side walls 15, a bulkhead 16, a stationary turret 17 and a forward deck 18.

Built integrally with each of the side walls 15 is a pontoon 20. Mounted upon each pontoon 20 is a track-laying belt mechanism 21 which includes a series of bogie wheels 22 provided along the lower edge of the pontoon, a pair of idle rollers 23 mounted on top of the pontoon, an idle sprocket 24 mounted on the rear upper corner of the pontoon, a drive sprocket 25 mounted on one end of a transmission 26 provided in the front end of the hull, and a track-laying belt 30 which is trained about the sprockets 24 and 25, rollers 23 and bogie wheels 22. This belt has a series of grousers 31 which support and propel the amphibian when operating on land and which engage the water to propel the amphibian when it is afloat.

When traveling on land, the grousers support the hull 11 so that the bottom plate 12 has adequate clearance to pass over obstacles normally encountered in such travel.

The transmission 26 has a high speed shaft 35 carrying a sprocket 36, through which power is delivered to the transmission, the latter being controllable to differentially drive the track-laying belts 30 forwardly at various speeds or to drive these in reverse. Some of the levers for controlling this transmission are shown, but it is unnecessary to illustrate or describe the details of this transmission as these are well understood in the art.

Provided on the hull 11 and cooperating with the side walls 15 and bulkhead 16 to form a cargo compartment 40, is a cargo floor 41 which is well below the water line and is spaced from the hull bottom 12 to form a shallow bilge and engine compartment 42. Mounted in the engine compartment 42 is an engine 43, which is flat in design and is preferably an opposed-cylinder internal combustion engine. The engine 43 is preferably provided with a water jacket 50 which is connected by tubes 51 and 52 with a water radiator 53. Air vents 55 and 56 are provided along the upper edge of the bulkhead 16. The vent 55 is connected by conduit 57 which the exhaust side of the radiator 53. The vent 56 is connected by a conduit 58 to the intake end of a blower 60 which delivers air to the intake end of the radiator 53. The blower 60 is preferably driven by belts 61 directly from the engine 43.

Journalled in suitable bearings mounted on the hull 11 so as to be parallel with and directly below the shaft 35, is a jack shaft 70 having a sprocket 71 which is connected to the sprocket 36 by an endless chain 72 trained about these sprockets. The engine 43 is connected with the shaft 70 through suitable universal joints 75 and 76 and a shaft 77. Thus power is transmitted from the engine 43 to the transmission 26.

Closing the back end of the cargo compartment 40 is a gate or drop door 85 which is strongly constructed and mounted on hinges 86 provided on the hull 11 adjacent the rear edge of the floor 41. Hingedly connected to the lower edge of the door 85 is a plate 87 which overlies the gap between the lower edge of the door and the floor 41 when the door is open as indicated by broken lines 89 in Fig. 3. The opening and closing of the door 85 is controlled by cables 90 which are adapted to be wound up on or paid out from winches 91 provided in the hull walls 15. The door 85 has tongues 92 which fit into grooves 93 in the rear edges of the walls 15 so as to solidly integrate this door and the rear ends of these walls when said door is closed. Suitable sealing means, such as strips 95 of rubber or other elastic material, are provided about the opening into which the door 85 fits, so that these strips are compressed between the door and the hull when the door is closed, to produce a satisfactorily water-tight seal, preventing the entrance of water into the amphibian.

It is to be noted that in the construction of my invention the engine 43 is located on the opposite side of the center of buoyancy of the amphibian 10 from the transmission 26. These are the two heaviest pieces of equipment on the amphibian, and they must be disposed so as to have a substantial balancing effect upon each other in order for the ship to be properly trimmed when it is traveling empty. This disposition of these pieces of equipment in my invention permits the installation of the door 85 in one end of the hull, so as to eliminate the disadvantages inherent in the amphibian which must be loaded or unloaded by passing the cargo or men carried thereby over the topside.

The door 85 not only renders it much easier to load or unload heavy articles of cargo carried by the amphibian but permits the discharge of soldiers carried thereby without exposing them to enemy fire, by turning the amphibian with the door 85 away from the enemy and allowing the soldiers to disembark and keep covered by the amphibian until they are ready for deploying and going into action.

Another great advantage of the disposition of the heavy equipment on the amphibian 10 of my invention, is that the engine is here located at a low level on the hull, thereby greatly increasing the stability of the craft. Fuel may be carried in tanks 98, mounted in the pontoons 20, and fed by gravity to the engine 43.

I claim:

1. An amphibian, comprising: a hull having a bottom, and side walls; two track-laying belts; means for mounting said belts on said side walls of said hull, said belts being equipped with means for propelling said amphibian when afloat, and for supporting and propelling the same when traveling on land, and at a height to give adequate clearance to permit said bottom to pass over obstacles encountered in land travel; means forming a cargo compartment in said hull, having a floor spaced from said bottom to form a relatively shallow engine compartment between said bottom and said floor; a relatively flat internal combustion engine mounted in said engine compartment, said engine being disposed between one end of said amphibian and the center of buoyancy thereof; a gear box disposed on the opposite side of said center of buoyancy from said engine for transmitting power from said engine to said belts; and means for transmitting power from said engine to said gear box.

2. An amphibian, comprising: a hull having bottom, and side walls; two track-laying belts; means for mounting said belts on said side walls of said hull, said belts being equipped with means for propelling said amphibian when afloat, and for supporting and propelling the same when traveling on land, and at a height to give adequate clearance to permit said bottom to pass over obstacles encountered in land travel; means forming a cargo compartment in said hull, having a floor spaced from said bottom to form a relatively shallow engine compartment between said bottom and said floor; a relatively flat internal combustion engine mounted in said engine compartment, said engine being disposed between one end of said amphibian and the center of buoyancy thereof, a transmission disposed on the opposite side of said center of buoyancy from said engine for transmitting power from said engine to said belts; means for transmitting power from said engine to said transmission; and means forming a door in one end of said hull.

3. An amphibian, comprising: a hull having a bottom, and side walls; means forming a control cabin and for closing one end of said hull; two track-laying belts; means for mounting said belts on said side walls of said hull, said belts being equipped with means for propelling said amphibian when afloat, and for supporting and propelling the same when traveling on land, and at a height to give adequate clearance to permit said bottom to pass over obstacles encountered in land travel; means forming a cargo compartment in said hull at the rear of said control cabin, said compartment having a floor spaced from said bottom to form a relatively shallow engine compartment between said bottom and said floor; a relatively flat internal combustion engine mounted in said engine compartment; gear power transmission means in said control cabin for selectively transmitting power to said belts; and means for transmitting power from said engine to said transmission means.

4. An amphibian, comprising: a hull having a bottom, and side walls; means forming a control cabin and for closing one end of said hull; two track-laying belts; means for mounting said belts on said side walls of said hull, said belts being equipped with means for propelling said amphibian when afloat, and for supporting and propelling the same when traveling on land, and at a height to give adequate clearance to permit said bottom to pass over obstacles encountered in land travel; means forming a cargo compartment in said hull at the rear of said control cabin, said compartment having a floor spaced from said bottom to form a relatively shallow engine compartment between said bottom and said floor; a relatively flat internal combustion engine mounted in said engine compartment; gear power transmission means in said control cabin for selectively transmitting power to said belts; means for transmitting power from said engine to said transmission means; and means forming a door in the opposite end of said hull, and for closing the corresponding end of said cargo compartment.

5. A combination as in claim 2, in which said transmission is located a substantial distance above said engine and lies substantially in a horizontal plane, and in which said means for transmitting power from said engine to said transmission includes a power transmitting element disposed in a vertical transverse plane lying between said engine and said transmission.

6. An amphibian, comprising: a hull having a bottom, and side walls and means forming a control cabin in one end thereof; two track-laying belts; means for mounting said belts on said side walls, said belts being equipped with means for propelling said amphibian when afloat and for supporting and propelling the same when traveling on land, and at a height to give adequate clearance to permit said bottom to pass over obstacles encountered in land travel; means forming a cargo compartment in said hull, having a floor spaced from said bottom to form a relatively shallow bilge; a transmission disposed in said control cabin in a substantially horizontal position for transmitting power to said belts; an engine mounted on said hull; a substantially horizontal shaft disposed in said bilge transmitting power from said engine to a point below said control cabin; and vertically disposed means for transmitting power from said shaft to said transmission.

7. An amphibian, comprising: a hull having a bottom, and side walls; two track-laying belts; means for mounting said belts on said side walls, said belts being equipped with means for propelling said amphibian when afloat and for supporting and propelling the same when traveling on land and at a height to give adequate clearance to permit said bottom to pass over obstacles encountered in land travel, upper runs of said belts being normally above the water line and lower runs of said belts being normally below the water line when said amphibian is afloat; sprocket means disposed at opposite ends of said upper runs of said belts for guiding said upper runs and driving said belts; means forming a cargo compartment in said hull, having a floor disposed a substantial distance below said water line, and spaced from said bottom to form a relatively shallow engine compartment between said bottom and said floor; a relatively flat internal combustion engine mounted in said engine compartment; differential and transmission means disposed substantially on the level of said sprocket means at one end of said amphibian for driving said belts through said sprocket means; and means transmitting power from said engine to said transmission means.

8. An amphibian, comprising: a hull having a bottom, and side walls; two track-laying belts; means for mounting said belts on said side walls, said belts being equipped with means for propelling said amphibian when afloat and for supporting and propelling the same when traveling on land and at a height to give adequate clearance to permit said bottom to pass over obstacles encountered in land travel, upper runs of said belts being normally above the water line and lower runs of said belts being normally below the water line when said amphibian is afloat; sprocket means disposed at opposite ends of said upper runs of said belts for guiding said upper runs and driving said belts; means forming a cargo compartment in said hull, having a floor disposed a substantial distance below said water line, and spaced from said bottom to form a relatively shallow engine compartment between said bottom and said floor; a relatively flat internal combustion engine mounted in said engine compartment; differential and transmission means disposed substantially on the level of said sprocket means at one end of said amphibian for driving said belts through said sprocket means; means transmitting power from said engine to said transmission means; and means forming a door in the opposite end of said hull from said control cabin.

9. An amphibian, comprising: a hull having a bottom, and side walls; two track-laying belts; means for mounting said belts on said side walls, said belts being equipped with means for propelling said amphibian when afloat and for supporting and propelling the same when traveling on land and at a height to give adequate clearance to permit said bottom to pass over obstacles encountered in land travel, upper runs of said belts being normally above the water line and lower runs of said belts being normally below the water line when said amphibian is afloat; sprocket means disposed at opposite ends of said upper runs of said belts for guiding said upper runs and driving said belts; means forming a cargo compartment in said hull, having a floor disposed a substantial distance below said water line, and spaced from said bottom to form a relatively shallow engine compartment between said bottom and said floor; a relatively flat internal combustion engine mounted in said engine compartment; differential and transmission means disposed substantially on the level of said sprocket means at one end of said amphibian for driving said belts through said sprocket means; means transmitting power from said engine to said transmission means; means forming a door in the opposite end of said hull from said control cabin, said door being hinged to said hull at the level of said floor; and means for maintaining a water-tight seal between said door and said hull when said door is closed.

10. An amphibian, comprising: a hull having a bottom, and side walls; two track-laying belts; means for mounting said belts on said side walls, said belts being equipped with means for propelling said amphibian when afloat and for supporting and propelling the same when traveling on land and at a height to give adequate clearance to permit said bottom to pass over obstacles encountered in land travel, upper runs of said belts being normally above the water line and lower runs of said belts being normally below the water line when said amphibian is afloat; sprocket means disposed at opposite ends of said upper runs of said belts for guiding said upper runs and driving said belts; means forming a cargo compartment in said hull, having a floor disposed a substantial distance below said water line, and spaced from said bottom to form a relatively shallow engine compartment between said bottom and said floor; a relatively flat internal combustion engine mounted in said engine compartment; differential and transmission means disposed substantially on the level of said sprocket means at one end of said amphibian for driving said belts through said sprocket means; means transmitting power from said engine to said transmission means; means forming a door in the opposite end of said hull from said control cabin, said door being hinged to said hull at the level of said floor; means for maintaining a water-tight seal between said door and said hull when said door is closed; and means for lowering said door into contact with the ground when said amphibian is resting on land, to form a ramp for loading or unloading said amphibian.

JAMES M. HAIT.